(12) United States Patent
Pigeon

(10) Patent No.: US 8,842,697 B2
(45) Date of Patent: Sep. 23, 2014

(54) METHOD AND DEVICE FOR ALLOCATING MAC ADDRESSES IN A CARRIER-CURRENT COMMUNICATION NETWORK

(75) Inventor: Nicolas Pigeon, Rouen (FR)

(73) Assignee: Sagem Communications SAS, Paris (FR)

( * ) Notice: Subject to any disclaimer, the term of this patent is extended or adjusted under 35 U.S.C. 154(b) by 341 days.

(21) Appl. No.: 12/995,526

(22) PCT Filed: May 28, 2009

(86) PCT No.: PCT/EP2009/056501
§ 371 (c)(1),
(2), (4) Date: Feb. 16, 2011

(87) PCT Pub. No.: WO2009/147050
PCT Pub. Date: Dec. 10, 2009

(65) Prior Publication Data
US 2011/0235656 A1  Sep. 29, 2011

(30) Foreign Application Priority Data
Jun. 2, 2008 (FR) ...................... 08 53604

(51) Int. Cl.
*H04J 3/24* (2006.01)
*H04L 29/12* (2006.01)
*H04L 12/12* (2006.01)

(52) U.S. Cl.
CPC ...... *H04L 61/2038* (2013.01); *H04L 29/12839* (2013.01); *Y02B 60/35* (2013.01); *H04L 29/12254* (2013.01); *H04L 12/12* (2013.01); *H04L 61/6022* (2013.01); *Y02B 60/34* (2013.01)
USPC ............................ 370/475; 370/349; 370/471

(58) Field of Classification Search
USPC ......... 370/475, 474, 280, 290, 301, 349, 378, 370/379, 395.3, 395.4, 471, 470, 472, 508, 370/516, 340
See application file for complete search history.

(56) References Cited

U.S. PATENT DOCUMENTS 5,835,723 A * 11/1998 Andrews et al. .............. 709/226
6,538,575 B1  3/2003 Iwamoto
6,714,559 B1 * 3/2004 Meier .......................... 370/449

(Continued)

FOREIGN PATENT DOCUMENTS

EP  1 005 197  5/2000
EP  1 233 538  8/2002

OTHER PUBLICATIONS

International Search Report for PCT/EP2009/056501, mailed Oct. 7, 2009.

*Primary Examiner* — Ian N Moore
*Assistant Examiner* — Phong La
(74) *Attorney, Agent, or Firm* — Nixon & Vanderhye PC

(57) ABSTRACT

An improved method of allocating MAC addresses for an electrical distribution network to make it possible to save a great deal of time during the address allocation phase. The method stores, at the central address allocation device, a list of associations between the serial numbers of the devices and the MAC address allocated. The method also sends a cataloging request serving to allocate the MAC address prior to the sending of a communication frame. In this manner, the discovery phases for allocating the MAC addresses to devices without addresses are appreciably reduced. The time when the network is dedicated to such discovery is reduced, thereby increasing accordingly the useful communication time available in the network.

9 Claims, 2 Drawing Sheets

(56) References Cited

U.S. PATENT DOCUMENTS

| | | | |
|---|---|---|---|
| 6,822,957 B1* | 11/2004 | Schuster et al. | 370/389 |
| 8,144,717 B2* | 3/2012 | Blange et al. | 370/402 |
| 8,260,916 B2* | 9/2012 | Frietsch et al. | 709/225 |
| 2002/0126000 A1* | 9/2002 | Shintani et al. | 340/310.01 |
| 2003/0103521 A1* | 6/2003 | Raphaeli et al. | 370/445 |
| 2003/0177267 A1* | 9/2003 | Orava et al. | 709/245 |
| 2003/0224784 A1* | 12/2003 | Hunt et al. | 455/426.2 |
| 2005/0033707 A1* | 2/2005 | Ehlers et al. | 705/412 |
| 2005/0055432 A1* | 3/2005 | Rodgers | 709/223 |
| 2005/0081243 A1* | 4/2005 | Barrett et al. | 725/86 |
| 2005/0097213 A1* | 5/2005 | Barrett et al. | 709/231 |
| 2005/0157664 A1* | 7/2005 | Baum et al. | 370/256 |
| 2005/0184881 A1* | 8/2005 | Dusenberry et al. | 340/870.02 |
| 2006/0013150 A1* | 1/2006 | Park et al. | 370/254 |
| 2006/0020414 A1* | 1/2006 | Jiang | 702/122 |
| 2006/0174102 A1* | 8/2006 | Smith et al. | 713/150 |
| 2006/0265508 A1* | 11/2006 | Angel et al. | 709/230 |
| 2007/0043478 A1* | 2/2007 | Ehlers et al. | 700/276 |
| 2007/0073882 A1* | 3/2007 | Brown et al. | 709/226 |
| 2007/0211653 A1* | 9/2007 | Mizukoshi | 370/312 |
| 2007/0217414 A1* | 9/2007 | Berkman et al. | 370/390 |
| 2007/0245033 A1* | 10/2007 | Gavrilescu et al. | 709/230 |
| 2007/0266179 A1* | 11/2007 | Chavan et al. | 709/250 |
| 2007/0268866 A1* | 11/2007 | Choi | 370/331 |
| 2008/0056722 A1* | 3/2008 | Hendrix et al. | 398/108 |
| 2008/0084833 A1* | 4/2008 | Picard | 370/280 |
| 2008/0112364 A1* | 5/2008 | Kwon et al. | 370/331 |
| 2008/0116275 A1* | 5/2008 | Clarke et al. | 235/451 |
| 2009/0296668 A1* | 12/2009 | Capone et al. | 370/337 |
| 2012/0213184 A1* | 8/2012 | Choi et al. | 370/329 |
| 2012/0300776 A1* | 11/2012 | Liu et al. | 370/390 |

* cited by examiner

US 8,842,697 B2

METHOD AND DEVICE FOR ALLOCATING MAC ADDRESSES IN A CARRIER-CURRENT COMMUNICATION NETWORK

This application is the U.S. national phase of International Application No. PCT/EP2009/056501, filed 28 May 2009, which designated the U.S. and claims priority to French Application no. 08/53604, filed 2 Jun. 2008, the entire contents of each of which are hereby incorporated by reference.

BACKGROUND OF THE INVENTION

1. Field of the Invention

The present invention concerns the field of the allocation of communication addresses to devices connected to a power-line communication network. More particularly, these are networks of electric meters remotely read from a data concentration apparatus through the electrical network.

2. Description of Related Art

Remotely reading data on electric meters operating on the electrical network is known. This is generally done by equipment performing the readings and making up a summary for a computer network, for example the invoicing network of the electrical energy distribution operator. This apparatus is known by the term DC (standing for Data Concentrator).

In order to be remotely read, the meters are provided with a communication interface on the carrier current. This interface has in memory the serial number engraved on the apparatus. This number constitutes a unique permanent identification of each meter.

Communication on the carrier current is performed by means of modulated data frames on the cables of the electrical energy distribution network. These frames, an example of which can be seen in FIG. 4, consist of a preamble for identifying the frame 4.1, a part 4.2 constituting strictly speaking the transported data packet and a checksum 4.3 for checking the integrity thereof, for example by means of a CRC (Cyclic Redundancy Code). The destination of the frame is selected by means of an address, referred to as an MAC address, coded in 12 bits and allocated to each device that is to communicate with the network. Details concerning the format of these frames can be found in French Standard NF EN 61334-5-1 entitled "Distribution automation using distribution line carrier systems—Part 5-1: Lower layer profiles—The spread shift keying (S-FSK) profile", which completely reproduces the publication CEI 61334-5-1:2001.

In order to be able to communicate, a device connected to the electrical distribution network must therefore be allocated an MAC address. The allocation of these addresses is described in the French Standard NF EN 61334-4-511 entitled "Distribution automation using distribution line carrier systems—Part 4-511: Data communication protocols—System administration—CIASE protocol", which completely reproduces the publication CEI 61334-4-511:2001. This protocol enables a central device of the system to allocate MAC addresses to all the devices connected to the network. The method described involves numerous discovery phases that take up a great deal of time, the connection rate being low.

BRIEF SUMMARY OF THE INVENTION

The invention aims to propose an improved method of allocating MAC addresses for this type of network making it possible to save a great deal of time during the address allocation phase. This method proposes in particular to store, at the central address allocation device, a list of associations between the serial numbers of the devices and the MAC address allocated. It is also proposed to send a cataloguing request serving to allocate the MAC address prior to the sending of a communication frame.

In this way, the discovery phases for allocating the MAC addresses to devices without addresses are appreciably reduced. The time where the network is dedicated to such discovery is reduced thereby, increasing accordingly the useful communication time available in the network.

The invention concerns a method of allocating addresses known as MAC addresses to devices connected to an electricity distribution network by a data concentration apparatus, each device being provided with a distinct unchanging serial number, comprising a step of sending a request demanding discovery in general broadcast mode on the network, a step of receiving at least one discovery notification in response to this request coming from a device that does not have an allocated MAC address, the said device being identified by means of its serial number; a step of allocating an available MAC address to the device that replied; a step of sending a cataloguing request to the device that replied containing its serial number and the MAC address that was allocated to it and also comprising a step of storing the association between the serial number of the device and the MAC address that it allocated to it.

According to particular embodiment of the invention, the device being liable to lose the MAC address that was allocated to it after the elapse of a given time without communication, the method also comprises a step of sending a cataloguing request prior to the sending of a communication frame to the device.

According to a particular embodiment of the invention, the step of sending the registration frame prior to the sending of a communication frame is performed routinely for each sending of a communication frame.

According to a particular embodiment of the invention, the moment of the last sending of a communication frame to a device being stored, the step of sending the cataloguing request prior to the sending of a communication frame is performed only if the time since the last communication frame exceeds a given threshold.

According to a particular embodiment of the invention, the method also comprises a step of sending a cataloguing request to every device the association of which is stored during a phase of re-initialisation of the system.

According to a particular embodiment of the invention, the method also comprises a step of periodic sending of a request to demand discovery in general broadcast mode to enable an MAC address to be allocated to new devices that have appeared on the network.

According to a particular embodiment of the invention, the discovery demand requests comprising a first parameter defining a response percentage, the devices not having an MAC address allocated taking a response decision in accordance with a random draw with a probability of response equal to this first parameter, the first parameter is defined with a probability of one hundred percent.

According to a particular embodiment of the invention, the discovery demand requests comprise a second parameter defining a response window, the devices responding to this request having to define randomly a response time within this response window, this window being defined as less than 30 seconds.

According to a particular embodiment of the invention, the discovery demand requests comprising a second parameter defining a response window, the devices responding to this request having to randomly define a response time within this response window, this second parameter is calculated according to the number of devices that have replied and the number of collisions detected during a previous discovery step.

The invention also concerns a device for allocating addresses, referred to as MAC addresses, to devices connected to an electricity distribution network, each collected device being provided with a distinct unchangeable serial number, comprising means of sending a discovery demand request in general broadcast mode over the network; means of receiving at least one discovery notification in response to this request coming from a device that does have an MAC address allocated, the said device being identified by means of its serial number; means of allocating an available MAC address to the device that has responded, means of sending a cataloguing request to the device that has responded containing its serial number and the MAC address that has been allocated to it; the device also comprises means of storing the association between the serial number of the device and the MAC address that it has allocated to it.

According to a particular embodiment of the invention, the device being liable to lose the MAC address that was allocated to it after the elapse of a given time without communication, the device also comprises means of sending a registration frame prior to the sending of a communication frame intended for the device.

BRIEF DESCRIPTION OF THE DRAWINGS

The features of the invention mentioned above, as well as others, will emerge more clearly from a reading of the following description of an example embodiment, the said description being given in relation to the accompanying drawings, among which.

DETAILED DESCRIPTION OF THE INVENTION

Figure 1:
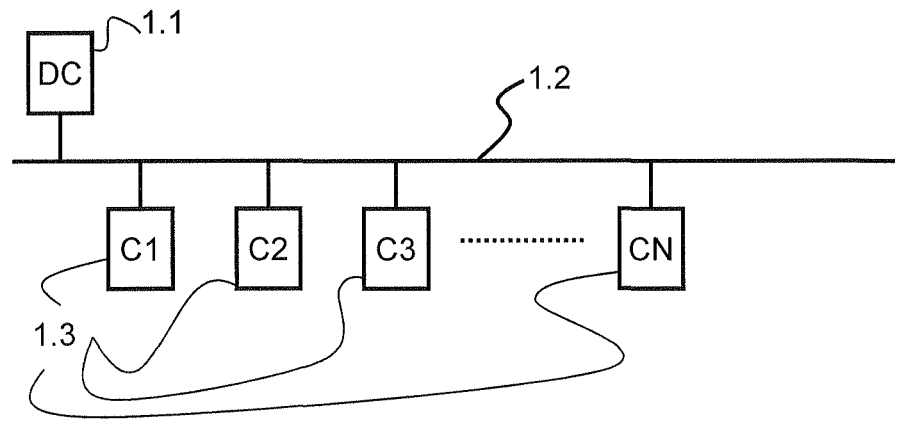
FIG. 1 illustrates the architecture of an example of an electrical distribution network.

FIG. 1 describes an example of an electrical energy distribution network 1.2. A first device 1.1 serving as a data concentrator is connected to this network. In the example embodiment of the invention, this device 1.1 also has the function of a CIASE client within the meaning of NF EN 61334-4-511, that is to say this device will also be responsible for the allocation of MAC addresses to the devices connected to the network. A certain number of these devices are illustrated under the reference 1.3. Typically, these devices are meters, C1 to CN, used to meter the quantity of electrical energy consumed by each subscriber. Although described as electricity meters, these, devices can be of any type insofar as they are caused to communicate with the device DC 1.1. In the context of the example embodiment, the DC is responsible for collecting the consumption data from the meters 1.3 in order to feed an information system of the operator managing the energy distribution network.

In this system, each device is provided with an unchangeable serial number for distinguishing it uniquely on the network. This number is called system_title in the aforementioned standard. It also contains an MAC address field initialised to the value NEW when the system is initialised. This value indicates that the device is new on the network and that it does not have an MAC address allocated, and it will be said that this device is in the non-allocated state.

In order to be able to communicate on the network, any device must be allocated an MAC address. This is because the addressing of the destination of a communication frame is done by means of this address. A procedure of discovering the devices connected is necessary in order to allocate this address to them. This procedure is described in the CIASE standard already mentioned. It consists, for the device responsible for allocating the addresses, of sending a so-called search demand request. It should be noted here that the discovery phase is initiated by the DC just like any communication in the network. In this type of network, the communications are never at the initiative of a connected device, but always at the initiative of the central server. This request is sent in general broadcast mode, that is to say it is intended for all the devices connected to the network. Only the devices in the non-allocated state and therefore having an MAC address field at NEW will respond to this request by a search notification indicated their serial number. The MAC address allocation device, here the DC, allocates an address to them and responds by means of a cataloguing request containing the serial number of the device that replied and the MAC address that is allocated to it. The device receiving this request and recognising its serial number in the request then gives its MAC address field with the associated MAC address. It is then in the allocated state and can consequently communicate on the network. In this document the operation consisting, for the allocation device, of sending a discovery demand request, receiving all the responses to this request, allocating MAC addresses to the devices that have responded and sending the corresponding cataloguing messages to the device in order to allocate their MAC address to them, is called the discovery phase.

It should be noted that these communications are carried out at 1200 baud and therefore take a great deal of time. Moreover, as soon as the number of devices that are to be allocated increases, the risk of collision between the various search notifications sent by all these devices increases significantly. It is then necessary to reiterate their discovery phases until all the devices have been able to be allocated. The standard provides for two mechanisms for assisting the discovery phase management in the networks containing a large number of devices to be discovered. These mechanisms are based on two parameters that can be used in the discovery demand request. The first parameter is a response percentage represented by an integer between 1 and 100. When the discovery demand is received, a non-allocated device will draw at random an integer number between 1 and 100 and if this number is less or equal to the response probability parameter it takes the decision to respond. It can be seen that by this mechanism it is possible to define the percentage of devices that have to be allocated and that will respond to a given discovery demand request. It is thus possible to limit the number of devices that will attempt to respond and therefore collisions between these responses. It will be understood that, the more this response percentage is limited, the more it is necessary to increase the discovery phases so that all the devices are allocated.

The second mechanism is based on a second parameter in the discovery demand request which defines a time window for the response. The time is counted in slots, these slots typically lasting for 300 milliseconds. The time window parameter defines a number of slots in 15 bits allocated to the responses of the devices. It can be seen that the time window can be defined up to a period of approximately 3 hours. When a device is to be allocated, it draws a random number that enables it to position its response in time within the time window thus defined. This mechanism makes it possible to spread in time the responses of the devices that are to be allocated within this time window. These two mechanisms therefore make it possible firstly to reduce the number of devices that are to respond and secondly to distribute these responses over time in order to limit collisions.

Despite the use of these mechanisms, as soon as the number of the devices that are to be allocated is around a thousand, the discovery involves numerous discovery phases using a low response probability and long time window, which may last for several hours, or even exceed one day of discovery. During this time, the network cannot be used usefully for operations of remote reading of the meters.

It should be noted that, at each re-initialisation of the system, all the devices are in a non-allocated state. Re-initialisation then requires a complete discovery of the network. Moreover, discovery procedures must be carried out very regularly in order to make it possible firstly to allocate an address to any new devices that may have been connected to the network and secondly to reallocate an address to any devices that may have lost their address because of the mechanism causing loss of the MAC address after a given time without communication.

Moreover, once a certain time has passed without communication, the devices lose their MAC address. This time is typically 12 hours. When the discovery lasts for more than 12 hours, the first devices allocated lose their address and are non-allocated before the end of the discovery. This procedure then never ends.

To overcome these problems, the invention proposes storing, at the MAC address allocation device, the addresses allocated to the devices. This storage takes place, for example, in the form of a list of associations between the serial numbers of the devices and the MAC address allocated. In this way, the discovery procedure is initialised by a sending of cataloguing requests to all the devices stored. Once this sending has taken place, it is possible to perform a conventional discovery procedure. It is thus ensured that a small number of devices will have been allocated during this discovery phase. More precisely, only the new devices appearing on the network will have to be allocated. This number being more restricted apart from major modifications to the network, it is then possible advantageously to position the response probability parameter at 100, thereby enabling all the non-allocated devices to respond. Advantageously, also, time windows of short duration will be used. Typically, a time window of around fifteen seconds enabling approximately 25 devices to respond can be used instead of windows lasting typically many minutes. In any event, it will be possible to use time windows of less than 30 seconds.

Advantageously, the storage mechanism makes it possible to implement a mechanism consisting of sending a cataloguing request to a device prior to the sending of a communication frame. In this way, the fact that the device may have lost its MAC address is guarded against. This is because the device receiving a cataloguing request will re-initialise its MAC address if it has lost it. It is then in a position to receive the communication frame. This re-initialisation of the MAC address takes place independently of the discovery mechanism. The periodicity of the discovery procedures can then be reduced since they then serve only for the discovery of new devices connected to the network.

Advantageously, this cataloguing request is sent systematically prior to the sending of all the communication frames. It is then ensured that the communication frame is intended for the allocated device.

Alternatively, it is also possible to store the moment of the last communication with each device. It is then possible to limit the prior sending of the cataloguing request to the devices with which the DC has not communicated for a given time, generally corresponding to the time after which the device loses its MAC address. The number of cataloguing requests that have to be sent is then limited.

Advantageously, it may be sought to determine the number of collisions occurring in response to the sending of a discovery demand request. A collision is detected when the DC receives a correct preamble but the checksum is wrong. It is deduced from this that at least one other response has disturbed the sending of the first. If the number of collisions is high, it is possible either to increase the response time window or decrease the response probability, or both, to enable a large number of devices to respond.

Figure 2:
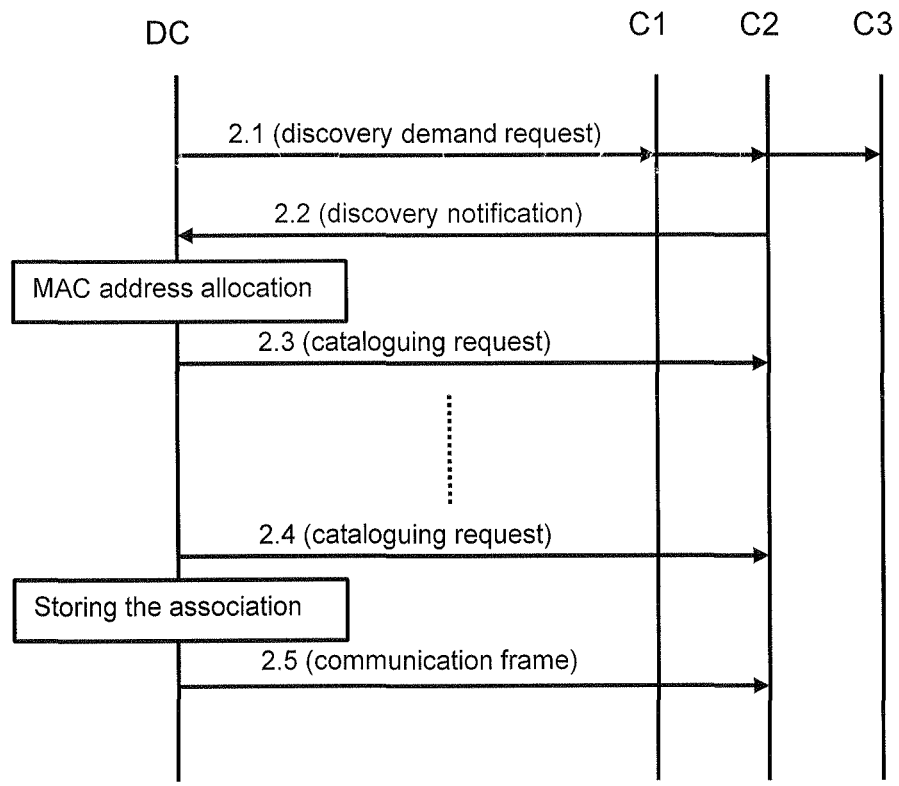
FIG. 2 illustrates the sequencing of the exchange of requests during a discovery and communication phase according to an example embodiment of the invention.

FIG. 2 illustrates the message exchanges according to an example embodiment of the invention. The DC sends a discovery demand request 2.1, which is received by the devices C1, C2 and C3. In the example sketched, only C2 is non-allocated and responds with a discovery notification 2.2 to the DC. The latter then allocates to it an MAC address, which it stores, and sends to it a cataloguing request 2.3 containing its serial number and its allocated MAC address. During a communication, the DC once again sends a prior cataloguing request 2.4 to the communication frame 2.5 in order to ensure that the device C2 is allocated prior to the communication and therefore in a position to receive the communication frame.

Figure 3:
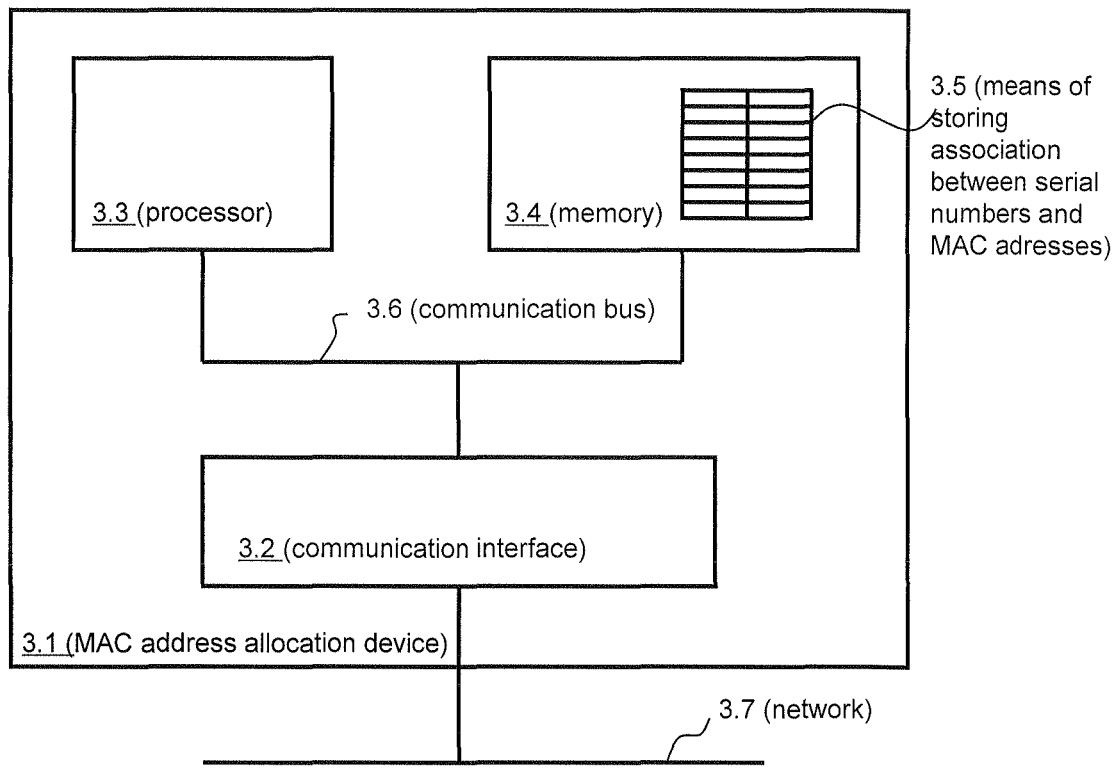
FIG. 3 illustrates the architecture of the MAC address allocation device according to an example embodiment of the invention.
Figure 4:
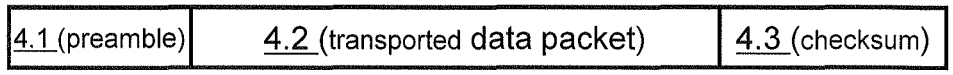
FIG. 4 illustrates the frame format used in the system.

FIG. 3 illustrates an example of architecture of the MAC address allocation device according to the invention 3.1. This device is connected to an electrical energy distribution network 3.7. It has a processor 3.3 for implementing the previously described method. It also has a memory 3.4 containing a means 3.5 of storing the association between the serial numbers and the MAC addresses of the devices. This means is for example a list of associations. The processor and the memory communicate by means of a communication bus 3.6, which also affords communication with the carrier code communication interface 3.2 connected to the network 3.7.

The invention claimed is:

1. A method of allocating addresses, known as MAC addresses, to network devices connected to an electricity distribution network, each network device being provided with a distinct unchangeable serial number, said method being performed by a data concentration apparatus and comprising:

sending a discovery demand request in general broadcast mode over said electricity distribution network;

receiving at least one discovery notification, in response to the discovery demand request, from a network device not having a MAC address allocated, said network device being identified in the discovery notification by means of the serial number;

allocating an available MAC address to the network device that responded to the discovery demand request;

sending a first cataloguing request to the network device that responded to the discovery demand request, said first cataloguing request containing the serial number of said network device that responded to the discovery demand request and the MAC address allocated to said network device that responded to the discovery demand request;

wherein said method further comprises:

storing an association between the serial number of the network device that responded to the discovery demand request and the MAC address allocated to said network device that responded to the discovery demand request;

and wherein said each network device being liable to lose the MAC address allocated to said each network device when a given time period has elapsed without communication, said method further comprises:

storing an information representative of a moment corresponding to a last sending of a communication frame to the network device that responded to the discovery demand request and, prior to sending a communication frame to the network device that responded to the discovery demand request, sending a second cataloguing request to said network device that responded to the discovery demand request, the sending of the second cataloguing request being performed only if a time period since the moment corresponding to the last sending of the communication frame exceeds a given threshold.

2. The method according to claim 1, wherein sending the second cataloguing request prior to sending the communication frame is performed systematically for each communication frame transmitted by the data concentration apparatus to said network device to which the communication frame is sent.

3. The method according to claim 1, wherein said method further comprises:

sending a third cataloguing request, during a phase of system re-initialisation, to any network device for which the association of the MAC address with the serial number has been stored prior to the system re-initialisation.

4. The method according to claim 1, wherein said method further comprises:

periodically sending the discovery demand request in general broadcast mode to enable the MAC address to be allocated to new network devices that have appeared on said electricity distribution network.

5. The method according to claim 4, wherein, said each discovery demand request comprising a parameter defining a response percentage, the network devices that do not have an allocated MAC address taking a response decision in accordance with a random drawing with a probability of response equal to the parameter, the parameter is defined with a probability of one hundred percent.

6. The method according to claim 4, wherein, said each discovery demand request comprising a parameter defining a response window, the network devices responding to one of said each discovery demand request having to define randomly a response time within said response window, said response window is defined as less than 30 seconds.

7. The method according to claim 4, wherein, said each discovery demand request comprises a parameter defining a response window, the network devices responding to one of said each discovery demand request having to define randomly a response time within said response window, the parameter is calculated according to a number of network devices that have responded to a discovery demand request in a previous discovery phase and according to a number of collisions detected during said previous discovery phase.

8. A device for allocating addresses, known as MAC addresses, to network devices connected to an electricity distribution network, each network device being provided with a distinct unchangeable serial number, comprising:

means for sending a discovery demand request in general broadcast mode over the electricity distribution network;

means for receiving at least one discovery notification in response to the discovery demand request, from a network device not having an MAC address allocated, said network device being identified in the discovery notification by means of the serial number;

means for allocating an available MAC address to the network device that responded to the discovery demand request;

means for sending a first cataloguing request to the network device that responded to the discovery demand request, the first cataloguing request containing the serial number of said network device that responded to the discovery demand request and the MAC address allocated to said network device that responded to the discovery demand request;

wherein said method further comprises:

means for storing an association between the serial number of said network device that responded to the discovery demand request and the MAC address allocated to said network device that responded to the discovery demand request;

and wherein, said each network device being liable to lose the MAC address allocated to said each network device when a given time period has elapsed without communication, said device for allocating addresses also comprises, means for storing an information representative of a moment corresponding to a last sending of a communication frame to the network device that responded to the discovery demand request and, implemented prior to sending a communication frame to the network device that responded to the discovery demand request, means for sending a second cataloguing request to the network device that responded to the discovery demand request, the sending of the second cataloguing request being performed only if a time period since the moment corresponding to the last sending of the communication frame exceeds a given threshold.

9. The device for allocating addresses according to claim 8, wherein said each network device further comprises means for sending a third cataloguing request, during a phase of system re-initialisation, to any network device for which the association of the MAC address with the serial number has been stored prior to the system re-initialisation.

* * * * *

UNITED STATES PATENT AND TRADEMARK OFFICE
CERTIFICATE OF CORRECTION

PATENT NO. : 8,842,697 B2
APPLICATION NO. : 12/995526
DATED : September 23, 2014
INVENTOR(S) : Pigeon Page 1 of 1

It is certified that error appears in the above-identified patent and that said Letters Patent is hereby corrected as shown below:

Title Page, item (73) Assignee:

change

"Sagem Communications SAS, Paris (FR)"

to

--Sagemcom Energy & Telecom SAS, Ruell-Malmaison (FR)--

Signed and Sealed this
Sixteenth Day of December, 2014

Michelle K. Lee
*Deputy Director of the United States Patent and Trademark Office*